(12) United States Patent
Shelton et al.

(10) Patent No.: US 11,203,334 B2
(45) Date of Patent: Dec. 21, 2021

(54) PROXIMITY DETECTION ZONE FOR WORKING MACHINE

(71) Applicant: Roadtec, Inc., Chattanooga, TN (US)

(72) Inventors: Lillian Nichole Shelton, Whitwell, TN (US); Rubin Cru Palmer, Trenton, GA (US); Byron Allan Payne, Ooltewah, TN (US)

(73) Assignee: Roadtec, Inc., Chattanooga, TN (US)

( * ) Notice: Subject to any disclaimer, the term of this patent is extended or adjusted under 35 U.S.C. 154(b) by 211 days.

(21) Appl. No.: 16/594,789

(22) Filed: Oct. 7, 2019

(65) Prior Publication Data

US 2020/0114909 A1   Apr. 16, 2020

Related U.S. Application Data

(60) Provisional application No. 62/743,929, filed on Oct. 10, 2018.

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/04* (2013.01); *B60W 10/10* (2013.01); *B60W 10/18* (2013.01);
(Continued)

(58) Field of Classification Search
CPC ...... B60W 30/09; B60W 10/18; B60W 10/04; B60W 10/10; B60W 2554/00; B60W 2710/18; B60W 2720/106; B60W 2400/00; B60W 2540/215; B60W 50/14; B60W 2050/143; B60W 2510/20; B60W 2050/0091; B60W 30/0956;
(Continued)

(56) References Cited

U.S. PATENT DOCUMENTS 6,226,593 B1   5/2001   Kurz et al.
7,035,735 B2   4/2006   Knoop et al.
(Continued)

OTHER PUBLICATIONS

International Search Report and Written Opinion of counterpart PCT Application No. PCT/US2019/55003 dated Dec. 19, 2019.

*Primary Examiner* — Dale W Hilgendorf
*Assistant Examiner* — Alexander C. Bost
(74) *Attorney, Agent, or Firm* — Chambliss, Bahner & Stophel, P.C.

(57) ABSTRACT

A working machine includes a braking assembly and a throttle assembly. A controller is operatively connected to the braking assembly and the throttle assembly. A proximity sensor is operatively connected to the controller and is adapted to emit radiation away from the rear of the working machine, and to receive reflected radiation indicating the presence of a person or object within a danger zone adjacent to the rear of the working machine and within a warning zone that extends beyond the danger zone. The proximity sensor is adapted to send a signal to the controller when it detects a person or object in the danger zone to cause the braking assembly to brake the working machine, and to send a signal to the controller when it detects a person or object in the warning zone to cause the throttle assembly to reduce the speed of the working machine.

17 Claims, 11 Drawing Sheets

(51) Int. Cl.
  *B60W 10/04* (2006.01)
  *B60W 10/10* (2012.01)

(52) U.S. Cl.
  CPC ..... *B60W 2400/00* (2013.01); *B60W 2554/00* (2020.02); *B60W 2710/18* (2013.01); *B60W 2720/106* (2013.01)

(58) Field of Classification Search
  CPC ..... B60W 30/18036; B60W 2554/802; B60W 2540/16; B60W 2520/06; B60W 2554/20; B60W 2554/4029; B60W 2300/17; B60W 2720/10
  See application file for complete search history.

(56) References Cited

U.S. PATENT DOCUMENTS

| | | | |
|---|---|---|---|
| 7,209,050 B2 | 4/2007 | Corcoran, III | |
| 7,565,242 B2 | 7/2009 | Lucas et al. | |
| 7,975,798 B2 | 7/2011 | Lucas et al. | |
| 8,696,236 B1 | 4/2014 | Frelich | |
| 9,327,699 B2 | 5/2016 | Agnew et al. | |
| 9,487,195 B2* | 11/2016 | Fujishiro | B60T 7/22 |
| 9,598,075 B2 | 3/2017 | Makino et al. | |
| 9,643,576 B2 | 5/2017 | Inomata | |
| 9,682,689 B2 | 6/2017 | Parker et al. | |
| 9,778,356 B2 | 10/2017 | Jung | |
| 9,789,858 B1 | 10/2017 | Parikh | |
| 9,896,095 B2* | 2/2018 | Katoh | B60W 10/20 |
| 9,944,259 B2 | 4/2018 | Bunk | |
| 10,053,065 B2 | 8/2018 | Ignaczak et al. | |
| 10,430,057 B2 | 10/2019 | Junck et al. | |
| 10,433,110 B1* | 10/2019 | Bergerhouse | H04W 4/023 |
| 2006/0091728 A1 | 5/2006 | Fulks et al. | |
| 2007/0288133 A1* | 12/2007 | Nishira | B60W 30/09 701/23 |
| 2009/0299596 A1 | 12/2009 | Albertsson et al. | |
| 2014/0222278 A1* | 8/2014 | Fujita | B60W 30/09 701/25 |
| 2014/0257622 A1 | 9/2014 | Shamlian et al. | |
| 2016/0078853 A1* | 3/2016 | Gonczi | A63F 13/798 700/92 |
| 2017/0079195 A1* | 3/2017 | Yokoyama | B60W 10/06 |
| 2017/0092093 A1* | 3/2017 | Dahbura | G08B 21/02 |
| 2017/0322301 A1* | 11/2017 | Ferrari | B60W 40/04 |
| 2018/0141751 A1* | 5/2018 | Muranaka | G05D 1/0066 |
| 2019/0161274 A1* | 5/2019 | Paschall, II | B65G 1/0492 |
| 2021/0046928 A1* | 2/2021 | Ohmura | B60W 30/18163 |

* cited by examiner

PROXIMITY DETECTION ZONE FOR WORKING MACHINE

CROSS-REFERENCE TO RELATED APPLICATION

This application claims the benefit of U.S. Provisional Patent Application No. 62/743,929, which was filed on Oct. 10, 2018.

FIELD OF THE INVENTION

This invention relates generally to a system for automatically slowing or stopping the movement of a roadway working machine during a road-working operation and/or for automatically alerting the operator of a working machine when a person or object is detected in one or more proximity detection zones.

BACKGROUND AND DESCRIPTION OF THE PRIOR ART

Roadwork is typically carried out by working machines that travel along a roadway or road bed and carry one or more working components that are adapted to contact the roadway or road bed surface. Some such working machines are employed to prepare a roadway for paving; others are employed in the paving process; still others are employed to repair existing roadways.

A road stabilizer is a type of working machine that may be employed to mill or pulverize a road bed in order to prepare it for initial paving (usually called stabilizing), or to mill or pulverize an existing roadway prior to repaving (usually called reclaiming). This type of working machine typically comprises a wheel-driven or track-driven vehicle that includes a working component comprising a milling drum having a plurality of cutting teeth disposed around its periphery. The milling drum is mounted for rotation about a substantially-horizontal axis within a drum housing on the frame of the machine. Steerable wheel-drive or track-drive ground-engaging assemblies operated by hydraulic motors are provided to drive the machine in a working direction and to steer it along a desired working path. The drive assemblies are attached to lifting columns that include internal linear actuators which can be activated to raise and lower the frame of the machine with respect to the road bed or roadway surface. Wheel-driven machines include four ground-engaging wheel-drive assemblies, one at the left front, one at the right front, one at the left rear and one at the right rear. Track-driven machines include three or four ground-engaging track-drive assemblies including one at the left front and one at the right front. Some such machines will also include a third track-drive assembly at the left rear and a fourth at the right rear; however, some track-drive machines will have only a single, center-mounted rear drive assembly.

Since the milling drum is mounted for rotation in a housing on the frame of the machine, raising the frame on the lifting columns can raise the milling drum out of contact with the roadway surface, and lowering the frame on the lifting columns can lower the milling drum into contact with the road surface so as to make a cut of the desired depth. The milling drum is rotated by a primary drum drive assembly typically comprising a drive belt driven by a diesel engine, which drive belt engages a drivetrain comprising a sheave on an input drive shaft for the milling drum. A gear box is typically located between the sheave and the milling drum and includes a gear train and an output drive shaft on which the milling drum is rotated. The gear box thus allows for rotation of the output drive shaft for the milling drum at a speed and torque that is different from that of the input drive shaft. Whether operated to prepare a road bed for initial paving or to mill an existing roadway prior to repaving, the road stabilizer will leave the milled material in place on the road bed or roadway, and subsequent operations will be carried out on this milled material by other working machines.

When it is desired to repair an existing roadway, it is common to overlay the existing pavement (whether of concrete or asphalt paving material) with a new layer (often called a leveling course) of concrete or asphalt paving material. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth to be filled across the width) as in the undamaged areas. The resulting reduced thickness in the overlay of the previously damaged areas will lead to renewed rutting or other wear damage in the new pavement in relatively short order. However, by milling the surface of the damaged pavement to a uniform surface elevation below the level of the damage, the addition of new pavement will produce a road surface having a consistent elevation across the entire width of the roadway. This repaving technique can be used to return the elevation of a damaged roadway to its original pre-damaged elevation, whereas the placement of a leveling course atop damaged but un-milled pavement will tend to raise the surface of the roadway or some portion thereof above its original elevation. Roadway repair without milling can require the raising of road shoulders, guardrails and manhole covers and the adjustment of overpass clearances, all of which are unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine that is used in roadway repair is another working machine that is similar to a road stabilizer. It typically comprises a wheel-driven or track-driven vehicle that includes a working component comprising a milling drum having a plurality of cutting teeth disposed around its periphery. The milling drum is mounted for rotation about a substantially-horizontal axis within a drum housing on the frame of the machine. Steerable wheel-drive or track-drive ground-engaging assemblies operated by hydraulic motors are provided to drive the machine in a milling direction and to steer it along a desired milling path. The drive assemblies are attached to lifting columns that include internal linear actuators which can be activated to raise and lower the frame of the machine with respect to the roadway surface. However, a milling machine will not typically lower the milling drum as low as a road stabilizer, and it will usually include a conveyor system that is designed to carry the milled material that has been cut from the roadway by the rotating milling drum to a location in front of or to the rear of the machine for deposit into a truck for removal from the milling site.

When it is desired to pave a new roadway with asphalt paving materials, or when a milling operation has been completed in a roadway repair process, paving over the road base or milled roadway with asphalt paving material is generally carried out by another working machine, an asphalt paving machine. Asphalt paving material is comprised of an asphaltic binder and aggregates of various particle sizes, including both coarse and fine aggregate materials. Because the equipment needed to produce hot asphalt paving material, also called hot mix asphalt or "HMA", is expensive and the space required extensive, HMA is typically produced in a production facility that is dedicated to such purpose. Consequently, it is frequently necessary to transport the HMA from its place of origin to an asphalt paving machine at a remote paving site. The HMA, at a temperature of up to 350° F., is transported in dump trucks to an asphalt paving machine or to another working machine, a material transfer vehicle that completes the transfer to the asphalt paving machine.

An asphalt paving machine is self-propelled and is driven by a wheel-driven or track-driven system. In a common type of paving machine, an asphalt receiving hopper is located at the front end of the machine to receive asphalt paving material from a truck or material transfer vehicle, and a slat-type hopper conveyor located below the asphalt receiving hopper transfers the asphalt paving material from the hopper to a working component comprising a distribution assembly that includes a transverse distributing auger that is mounted at the rear of the machine. The asphalt paving material is deposited onto and across the roadway or other surface to be paved by the distributing auger, and another working component comprising a floating screed that is located behind the distributing auger compacts the asphalt paving material to form an asphalt mat.

Sometimes, HMA is discharged directly from a delivery truck into the asphalt receiving hopper of the asphalt paving machine. When asphalt paving material is delivered to the paving machine in this manner, a series of delivery trucks must move into contact with the front end of the paving machine to serially discharge their loads into the paving machine hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). Consequently, a working machine comprising a material transfer vehicle may be used to shuttle HMA between the delivery trucks and the asphalt paving machine. Yet another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation.

A self-propelled material transfer vehicle comprises a working machine that typically includes a working component comprising a large-capacity truck-receiving hopper and an inclined truck-unloading conveyor extending upwardly from this hopper. A transversely oriented auger is usually provided in the truck-receiving hopper to urge HMA onto the truck-unloading conveyor. This HMA is carried upwardly by the truck-unloading conveyor from the truck-receiving hopper and discharged off the elevated output end of the truck-unloading conveyor into a chute mounted on the lower end of a paver-loading conveyor (in a tethered material transfer vehicle), or into an intermediate surge bin that is sized to hold the entire load of a delivery truck (in a material transfer vehicle that shuttles asphalt paving material from a pick-up point to a remote paving site). The discharge of HMA off the elevated output end of the truck-unloading conveyor so that it may fall under the influence of gravity into a chute or surge bin assists in preventing undesirable segregation of the various particulate components of the asphalt paving material by particle size.

Material transfer vehicles of the type that are equipped with a surge bin typically include an auger and a conveyor in the surge bin that are adapted to transfer the HMA to the paver-loading conveyor. Paver-loading conveyors mounted on material transfer vehicles with and without surge bins are generally pivotable about a substantially-vertical axis so that the material transfer vehicle can be positioned adjacent an asphalt paving machine that is laying an asphalt mat and rapidly discharge HMA into the hopper of the paving machine as the material transfer vehicle moves with the paving machine along the roadway. Because of its rapid loading and unloading capabilities, the type of material transfer vehicle that rapidly shuttles between delivery trucks at a pick-up point and an asphalt paving machine that is laying an asphalt mat at a paving site reduces the likelihood that the paving machine will have to stop paving because of a lack of asphalt paving material.

Cold in-place recycling ("CIR") equipment can be used to repair damage to a roadway in a single pass, while reusing essentially all of the existing asphalt pavement in the damaged areas. In the CIR process, damaged layers of asphalt pavement are removed. The removed material is processed and replaced on the roadway and then compacted. If a roadway has good structural strength, a CIR process can be effective for treating all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. The root cause of the pavement failure should always be investigated to rule out base failure. However, CIR can almost always be used when there is no damage to the base of the roadway. Generally, CIR is only half as expensive as paving with HMA, while providing approximately 80% of the strength of hot mix paving.

CIR can be carried out with the aid of a working machine comprising a road stabilizer or a milling machine that has been modified by mounting a spray assembly in the milling drum housing to inject asphalt cement into the milling drum housing. The asphalt cement is then thoroughly blended with the milled material by the milling drum and can be left in a windrow or fed by the milling machine's discharge conveyor directly into an asphalt paving machine. When the CIR process is carried out with only a road stabilizer or milling machine and an asphalt paving machine, the asphalt cement component of the cold mix asphalt ("CMA") must be supplied from a separate supply tank truck that is coupled to the modified road stabilizer or milling machine. The asphalt cement component is drawn directly from the tank on the supply truck and metered through a flow system that is mounted on the road stabilizer or milling machine to the spray assembly in the milling drum housing.

Sometimes the CIR process is carried out with a milling machine in train with a cold recycler machine such as the RT-500 that is made and sold by Roadtec, Inc. of Chattanooga, Tenn. The cold recycler machine is a working machine that may include a vibratory screen, a crusher, an onboard source of asphalt cement and a pugmill mixer, along with various conveyors. When the CIR process is carried out using a cold recycler machine, the recycled asphalt material that is milled by the milling machine is transferred to the vibratory screen and then to the crusher on the cold recycler machine, and the screened and crushed material is then mixed with asphalt cement that is dispensed by a spray assembly from an onboard supply tank into the pugmill to produce cold asphalt paving material, also called cold mix asphalt or "CMA". The CMA that is produced by this process can be left in a windrow on the roadway or fed by the cold recycler machine's discharge conveyor directly into an asphalt paving machine.

All of these working machines are driven by an operator who sits in an operator's station that allows the operator a good view of the roadway ahead of the machine. It is common for at least one ground worker associated with a working machine to walk alongside the working machine during the road-working operation in order to assist the operator in maintaining the desired position with respect to the side of the roadway or with respect to a cooperating truck or other working machine. The ground worker will also help to guide the operator when it is necessary to steer the working machine around obstacles or when it is necessary to move the working machine in a reverse direction. It is frequently necessary for a ground operator to walk behind the working machine from one side to the other. Road-working operations are loud and sometimes dusty, and although the ground workers and the operators are usually provided with hearing and dust protection equipment, they may be distracted by nearby persons, objects or vehicles.

It would be desirable if a control system could be provided that would make it possible for a ground worker to stop a working machine without communicating with the operator. It would also be desirable if such a control system would include a proximity sensor that can automatically detect the presence of a person or object in one or more proximity zones behind or adjacent to the working machine.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "coupled", "connected" and "interconnected", refer to a relationship wherein structures are secured or attached to one another either directly or indirectly through intervening structures, as well as both moveable and rigid attachments or relationships, unless specified herein or clearly indicated by context. The terms "operatively connected" and "operatively attached" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "milled material" and similar terms refer to Portland cement concrete material and asphalt pavement material that has been removed from a roadway by a milling machine, as well as base material in a road bed that has been pulverized by a road stabilizer.

The term "asphalt cement" refers to a bituminous fluid that is used in combination with aggregate materials in the production of asphalt paving material. The term "asphalt cement" includes asphalt emulsions which are chemically stabilized dispersions of asphalt cement in water.

The term "asphalt paving material" refers to a bituminous paving mixture that is comprised of asphalt cement and crushed stone, recycled asphalt shingles, milled materials and/or other aggregate materials of varying particle size, and which is used for paving purposes. Asphalt paving material includes HMA, which is heated, and CMA, which is not heated.

The term "roadworking material" refers to milled material and/or asphalt paving material.

The term "working machine" refers to a vehicle or machine that includes a working component which is adapted to perform a working operation on a roadway or road bed, and includes machines called milling machines, cold planers, road stabilizers, reclaiming machines, asphalt paving machines, pavers, and material transfer vehicles.

The term "linear actuator" refers to an electric, pneumatic, hydraulic, electro-hydraulic or mechanical device that generates force which is directed in a straight line.

The term "working direction" refers to the primary direction of travel of a working machine as it operates in working on a roadway or other surface.

The term "reverse direction" refers to the direction that is opposite to the working direction.

The terms "above", "upper" and similar terms, when used with respect to a working machine or a component of such a working machine, refer to a relative location or direction away from the surface on which the working machine is operated.

The terms "below", "lower" and similar terms, when used with respect to a working machine or a component of such a working machine, refer to a relative location or direction towards the surface on which the working machine is being operated.

The term "right", when used herein to describe a relative position or direction on or in connection with a working machine, or a component thereof, refers to the right side of the machine or component from the perspective of an operator who is operating the working machine as it travels in the working direction.

The term "left", when used herein to describe a relative position or direction on or in connection with a working machine or a component thereof, refers to the left side of the machine or component from the perspective of an operator who is operating the working machine as it travels in the working direction.

The terms "front", "forward" and similar terms, when used with respect to a working machine or a component of such a machine, refer to a relative location or direction towards the leading end of the working machine as it travels in the working direction.

The terms "rear", "behind" and similar terms, when used with respect to a working machine or a component of such a machine, refer to a relative location or direction towards the trailing end of the working machine as it travels in the working direction.

SUMMARY OF THE INVENTION

The invention comprises a control system for automatically slowing or stopping the movement of a working machine during a working operation on a roadway or road bed, and/or for automatically alerting the operator of a working machine when a person or object is detected in one or more proximity detection zones. A preferred embodiment of this system also includes a reverse disable button that is located at the rear of the working machine which may be activated by a ground worker in order to slow or stop the movement of the working machine or to prevent it from moving in a reverse direction, and/or to alert the operator. In a preferred embodiment of the invention, activation of a reverse disable button by a ground worker will quickly bring the working machine to a halt.

The invention includes a proximity sensor on or near the rear of the working machine that is adapted to detect the presence of a person or object in one or more predetermined proximity detection zones. The proximity sensor is operatively connected to a controller that is adapted to control the machine drive system and/or the braking system of the working machine. In a preferred embodiment of the invention, the controller is adapted to automatically slow the rate of movement of the working machine if a person or object is detected in a warning detection zone, and to stop the movement of the working machine if a person or object is detected in a danger detection zone. The preferred embodiment of the invention also includes one or more reverse disable buttons that are located so as to be accessible to a ground worker. The reverse disable buttons are operatively connected to the controller, which is adapted, in one embodiment of the invention, to prevent the machine from moving in the reverse direction when a reverse disable button is activated by a ground operator.

In order to facilitate an understanding of the invention, the preferred embodiments of the invention, as well as the best mode known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
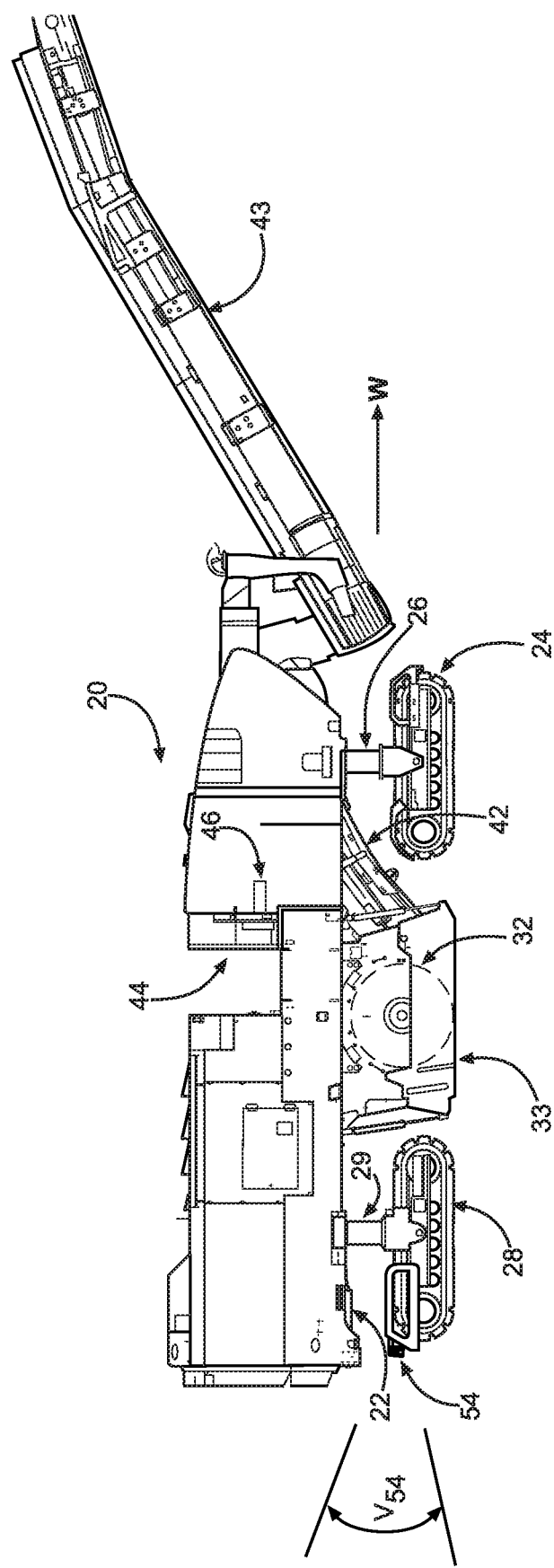
FIG. 1 is a side view of a milling machine which includes the invention.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIGS. 1-6 and 9, a working machine comprising a milling machine that is equipped with a first embodiment of the invention is indicated generally at 20. This machine comprises a mobile vehicle having a frame 22 and a plurality of ground-engaging drive assemblies that are attached to lifting columns, including right front track drive assembly 24 which is attached to lifting column 26, a left front track drive assembly (not shown but substantially similar to right front track drive assembly 24) which is attached to a lifting column (not shown but substantially similar to lifting column 26), right rear track drive assembly 28 which is attached to lifting column 29 and left rear track drive assembly 30 which is attached to a lifting column (not shown, but substantially similar to lifting column 29). As is known to those having ordinary skill in the art, other embodiments of the milling machine may include three ground-engaging track drive assemblies or four ground-engaging wheel drive assemblies.

Preferably, at least the front drive assemblies are steerable to provide precise directional control for the milling machine. In some embodiments of the invention, all of the ground-engaging drive assemblies are steerable.

Milling machine 20 also includes a milling assembly comprising a generally cylindrical milling drum 32 having a plurality of cutting teeth (not shown) mounted around its periphery. The milling drum is rotated about a substantially-horizontal axis of rotation within drum housing 33 on frame 22 by primary drum drive assembly 34. This primary drum drive assembly includes drive belt 35 that is operatively attached to and is driven by an engine drive shaft of diesel engine 36, as shown schematically in FIG. 3, on which engine drive sheave 37 is mounted. Drive belt 35 is also operatively attached to drum sheave 38 on an input drive shaft for milling drum 32. In other embodiments of the invention (not shown), the primary drum drive assembly comprises one or more hydraulic motors (not shown) and a drive belt that engages a sheave on an input shaft for the milling drum. Gear box 39 is located between drum sheave 38 and the milling drum (not shown in FIG. 3) in both the primary drum drive assembly comprising a direct engine drive shown in the drawings, and in a primary drum drive assembly that includes one or more hydraulic motors. Gear box 39 includes a gear train and an output drive shaft on which the milling drum is rotated. The gear box thus allows for rotation of the output drive shaft for the milling drum at a speed and torque that is different from that of the input drive shaft. Primary drum drive assembly 34 also includes a belt tensioning assembly including tensioning sheave 40, which is pivotally mounted within the primary drum drive assembly, and tensioning actuator 41 that is operatively attached to the tensioning sheave. Tensioning actuator 41 is a linear actuator that may be employed to move tensioning sheave 40 in order to increase or decrease the tension of drive belt 35.

Milling drum 32 is adapted for cutting a width of material from the surface in the path of the machine as milling machine 20 travels in working direction "W" (shown in FIG. 1), and for depositing the milled material on first conveyor 42, which carries it to second conveyor 43 for discharge into a truck. A machine drive system comprises a conventional hydraulic motor (not shown) for each of the ground-engaging drive assemblies. Each of these hydraulic drive motors, and the hydraulic motors for operating conveyors 42 and 43, are operatively attached to a conventional hydraulic circuit including a hydraulic pump (not shown), which hydraulic pump is driven by diesel engine 36.

A linear actuator (not shown) is mounted within each of the lifting columns of the ground-engaging drive assemblies and is operatively attached to the hydraulic circuit of the milling machine. These linear actuators are adapted to raise the frame of the milling machine and the milling drum with respect to the roadway surface, or to lower the frame and the milling drum with respect to the roadway surface.

Milling machine 20 is operated by an operator in operator's station 44 which includes controller 46. Controller 46 may embody a single microprocessor or multiple microprocessors that include components for controlling the invention, including primary drum drive assembly 34 for rotation of milling drum 32 and the machine drive system, as well as other operations of milling machine 20 based on input from an operator of the milling machine and on sensed or other known operational parameters. Thus, for example, controller 46 is operatively connected to gear shift assembly 48 (shown schematically in FIG. 3) for determining whether the milling machine is operated in a forward or a reverse direction, and to braking assembly 49 (also shown schematically in FIG. 3), and to throttle assembly 50 (shown schematically in FIG. 3) of engine 36, and to hydraulic clutch assembly 52 (also shown schematically in FIG. 3) for the primary drum drive assembly. Thus, controller 46 is adapted to control the speed and operation of the diesel engine and the direction of travel (i.e., in the working direction or in the reverse direction) of milling machine 20. Controller 46 is also operatively connected to the hydraulic pump or pumps in the conventional hydraulic circuit for milling machine 20 and to the valves for controlling the flow of hydraulic fluid in the hydraulic circuit to the various components within the circuit, such as the linear actuators in the lifting columns, the actuators that control the movement of certain components of machine 20 including conveyors 42 and 43, and the various hydraulic motors in the hydraulic circuit.

Controller 46 includes or is associated with a memory, and it will preferably include a data input component such as a touch screen, a joy stick, a keyboard and/or a plurality of actuating buttons for receiving input from an operator of the milling machine. Controller 46 may also include a data output component such as a display screen, a secondary storage device, a processor and other components for running an application. Various circuits may be associated with and operatively connected to the controller, such as power supply circuitry and hydraulic circuitry. Numerous commercially available microprocessors can be configured to perform the functions of controller 46. It should be appreciated that the controller could readily be embodied in a general purpose computer or machine microprocessor capable of controlling numerous milling machine functions.

Preferably, a pair of proximity sensors are mounted at or near the rear end of the working machine and are operatively attached to the controller. In the embodiment of the invention best shown in FIGS. 1 and 4-9, a first proximity sensor 54 is mounted on right rear fender 56 of right rear track drive ground engaging assembly 28 and a second proximity sensor 54 is mounted on left rear fender 58 of left rear track drive ground engaging assembly 30. Each of these proximity sensors 54 is adapted to detect the presence of persons or objects within one or more detection zones. More particularly, proximity sensors 54 are located and adapted to emit radiation within the electromagnetic spectrum in a direction away from the rear of the working machine, and to receive reflected radiation indicating the presence of a person or object within a predetermined first detection zone comprising a danger zone extending a first distance, such as for example, 6-10 feet from the sensors, and in a predetermined second detection zone comprising a warning zone extending beyond the danger zone by a second distance, such as for example, up to 20 feet from the sensors. Most preferably, the danger zone extends at least about 8 feet behind the working machine, and the warning zone extends an additional 8-12 feet behind the machine.

In this embodiment of the invention, if a proximity sensor detects a person or object in the danger zone, it will send a signal to controller 46 which will operate braking assembly 49 and/or throttle assembly 50 to bring milling machine 20 to a stop. Controller 46 will also send a danger signal to an operator in operator's station 44 when it receives a signal indicating that a proximity sensor has detected something in the danger zone. If a proximity sensor detects a person or object in the warning zone, it will preferably send a signal to controller 46 which will operate braking assembly 49 and/or throttle assembly 50 to slow the machine to half its previous speed. Controller 46 will also send a warning signal to an operator in operator's station 44 when it receives a signal indicating that a proximity sensor has detected something in the warning zone. Controller 46 may also be programmed so that the operator can override the automatic actions initiated by the proximity sensors. In other embodiments of the invention, the controller may be programmed so that if the milling machine is operating at a speed below a predetermined minimum, such as, for example, 30 feet/minute, it will not slow the machine if the proximity sensor detects a person or object in the warning zone (although it may be programmed to alert the operator), but it will bring the machine to a halt if the proximity sensor detects a person or object in the danger zone.

Figure 4:
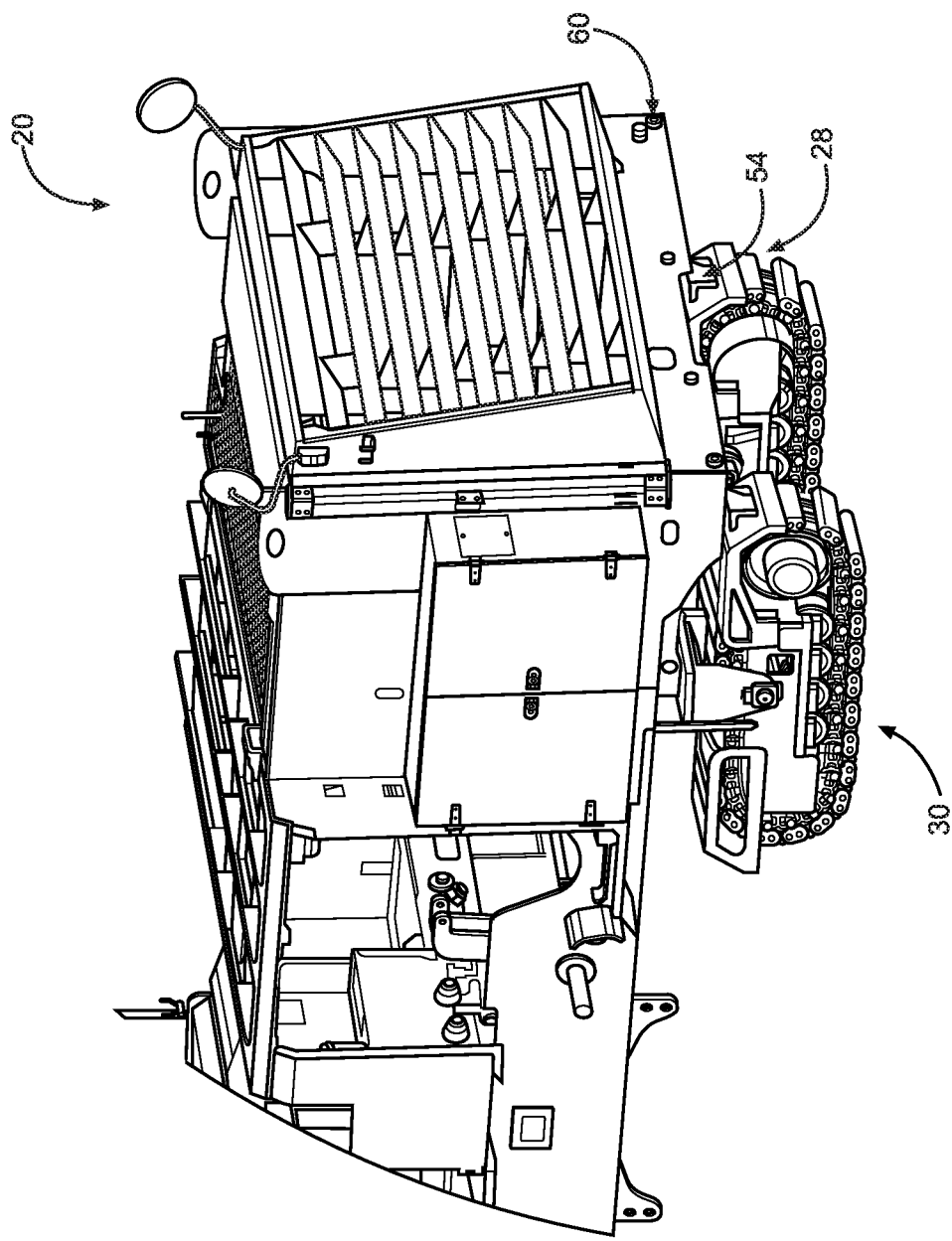
FIG. 4 is a first perspective rear view of a portion of the milling machine shown in FIGS. 1 and 2.
Figure 5:
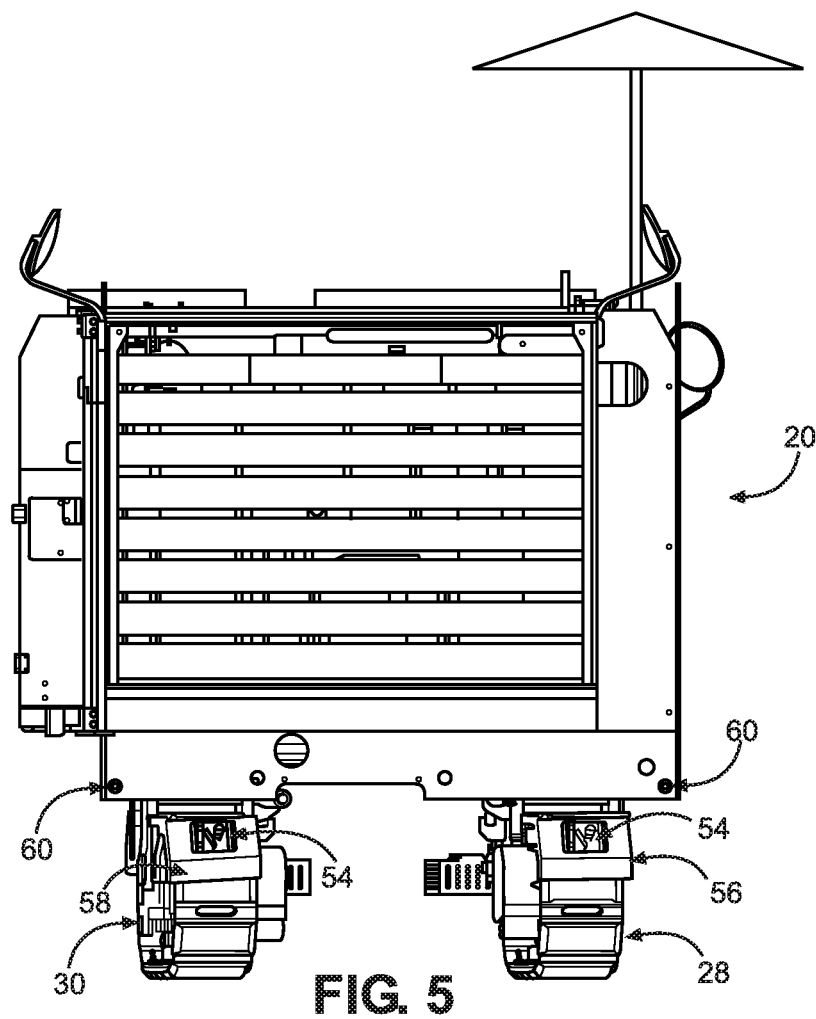
FIG. 5 is a second perspective rear view of a portion of the milling machine shown in FIGS. 1, 2 and 4.
Figure 6:
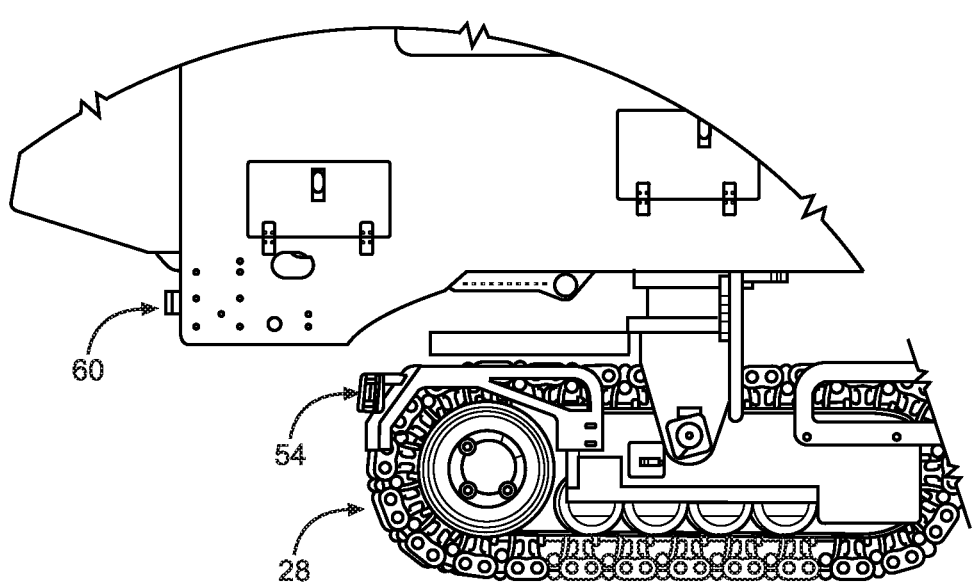
FIG. 6 is a side view of a portion of a rear track drive assembly of the milling machine shown in FIGS. 1, 2, 4 and 5.
Figure 7:
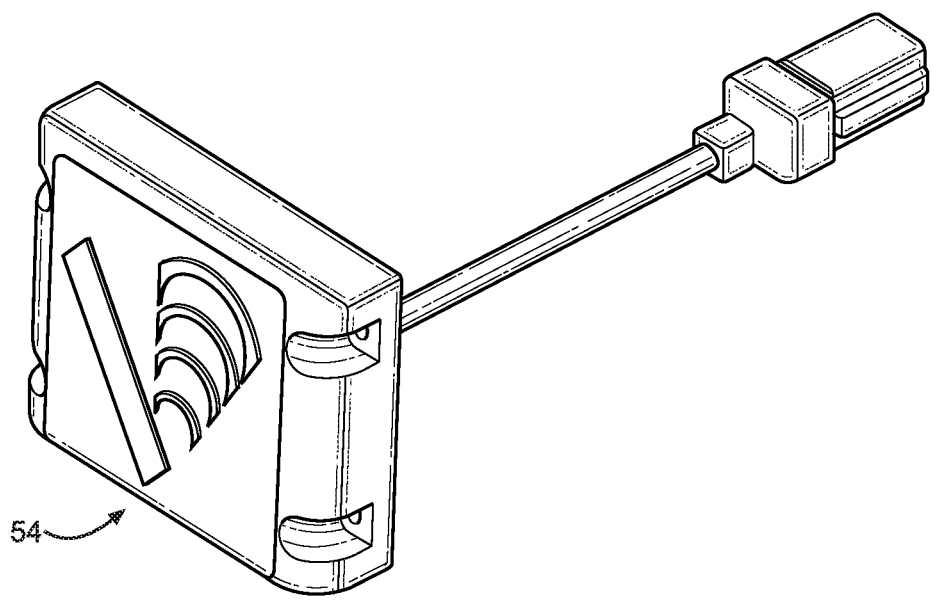
FIG. 7 is a perspective view of a first embodiment of a proximity sensor for detecting the presence of a person, object or vehicle in a detection zone adjacent to the milling machine.
Figure 8:
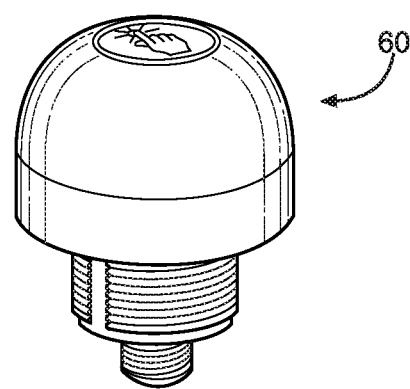
FIG. 8 is a perspective view of a preferred embodiment of a reverse disable button which may be activated to prevent the milling machine from moving in the reverse direction.
Figure 9:
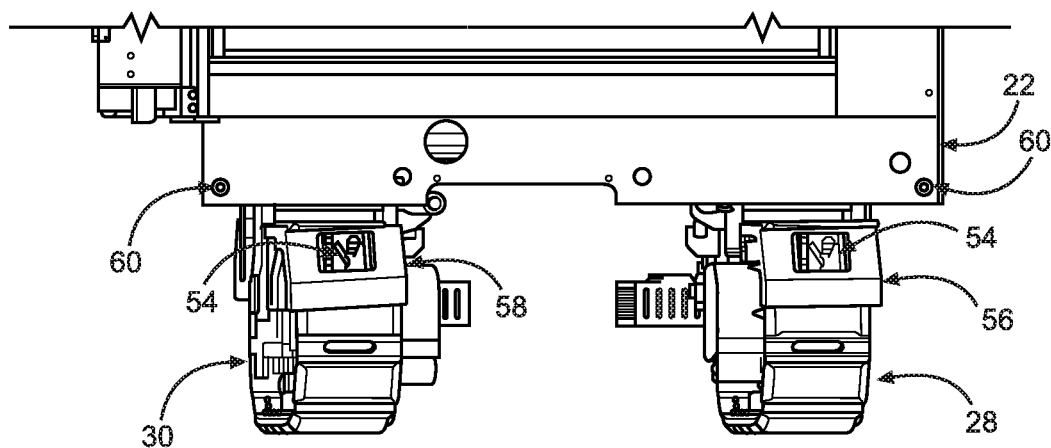
FIG. 9 is a rear perspective view of a portion of the milling machine shown in FIGS. 1, 2 and 4-6, showing a preferred location for the first embodiment of the proximity sensors and preferred locations for the reverse disable buttons.
Figure 10:
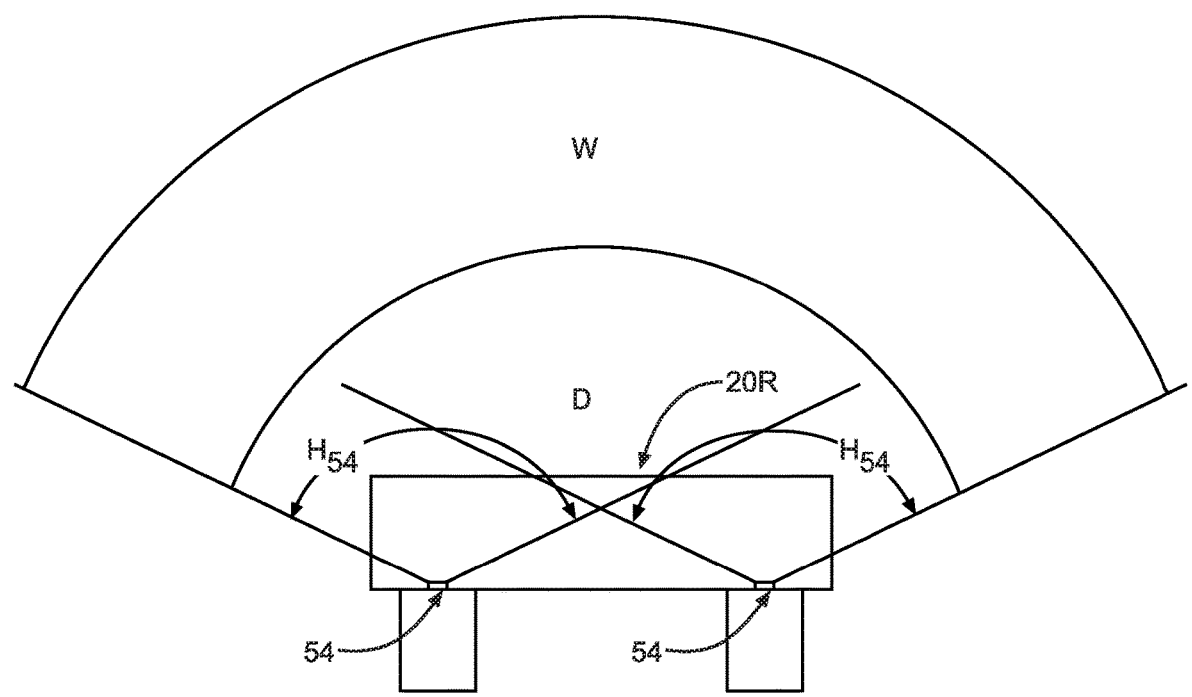
FIG. 10 is a schematic illustration of an embodiment of the detection zones for the first embodiment of the proximity sensors as mounted on the milling machine shown in FIGS. 1, 2, 4-6 and 9.

FIG. 10 shows an embodiment of the danger and warning zones behind the rear end 20R of milling machine 20, which is equipped with two rear track drive assemblies and two proximity sensors 54, as shown in FIGS. 4, 5 and 9. As shown therein, "D" indicates the danger zone, and "W" indicates the warning zone behind milling machine 20. In this embodiment of the invention, it is possible that when the rear track drive assemblies are turned to steer the machine, the turning radius is so tight that the proximity sensor on the outside track drive assembly will detect the inside track drive assembly, causing a false trigger of the proximity detection system. In such cases, the controller can be configured and adapted to designate the proximity sensor on the inside track drive assembly in a turn to be the dominant sensor and turn off (or ignore) the proximity sensor on the outside track drive assembly. In other words, the controller is configured and adapted so that when the left and right steerable rear track drive assemblies are operated to turn the working machine to the left, the controller will designate the left proximity sensor to be the dominant sensor and will ignore any signals received from the right sensor, and similarly, when the left and right steerable rear track drive assemblies are operated to turn the working machine to the right, the controller will designate the right proximity sensor to be the dominant sensor and will ignore any signals received from the left sensor. In the alternative, the controller may be programmed with dimensional information relating to the track drive assemblies so that it will recognize the inside track drive assembly as the item detected by the proximity sensor on the outside track drive assembly in the proximity zone, and in such circumstances, will not slow or stop the milling machine.

Figure 11:
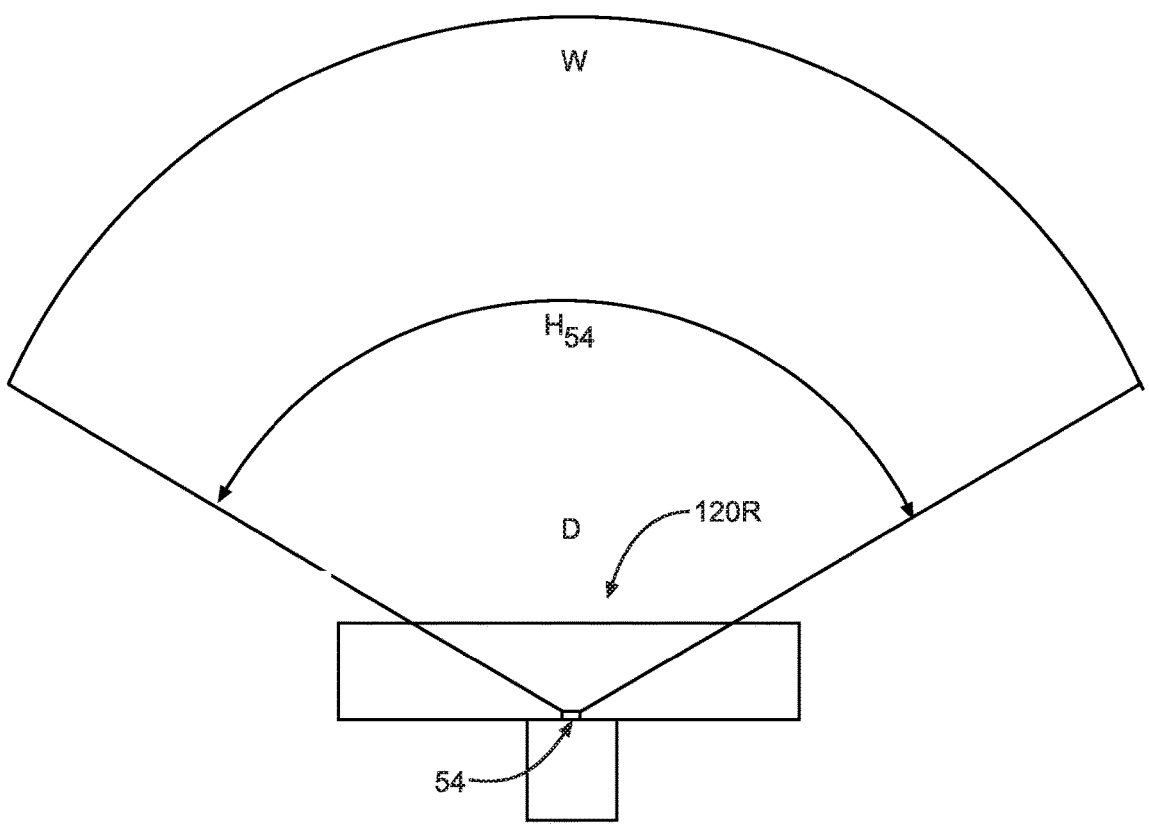
FIG. 11 is a schematic illustration of an embodiment of the detection zones for the first embodiment of the proximity sensors as mounted on a milling machine similar to that shown in FIGS. 1, 2, 4-6 and 9, but comprising a milling machine having only three track-drive assemblies.

FIG. 11 shows an embodiment of the danger and warning zones behind the rear end 120R of milling machine 120 (shown only schematically), which is essentially identical to milling machine 20 except that it has only one centrally located rear track drive assembly and only one proximity sensor 54 mounted on the rear fender. As shown therein, "D" indicates the danger zone, and "W" indicates the warning zone behind milling machine 120.

Figure 2:
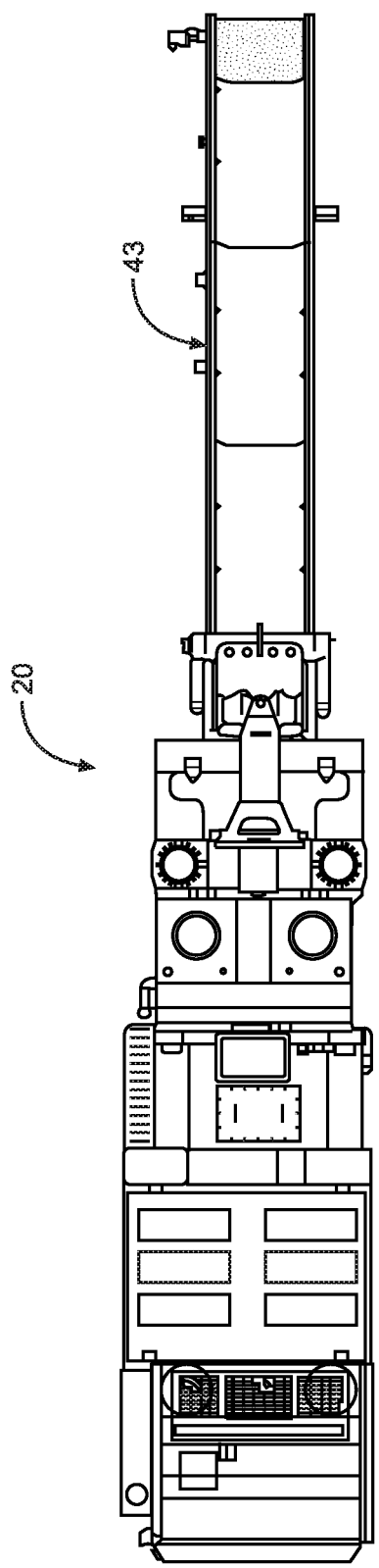
FIG. 2 is a top view of the milling machine shown in FIG. 1.
Figure 3:
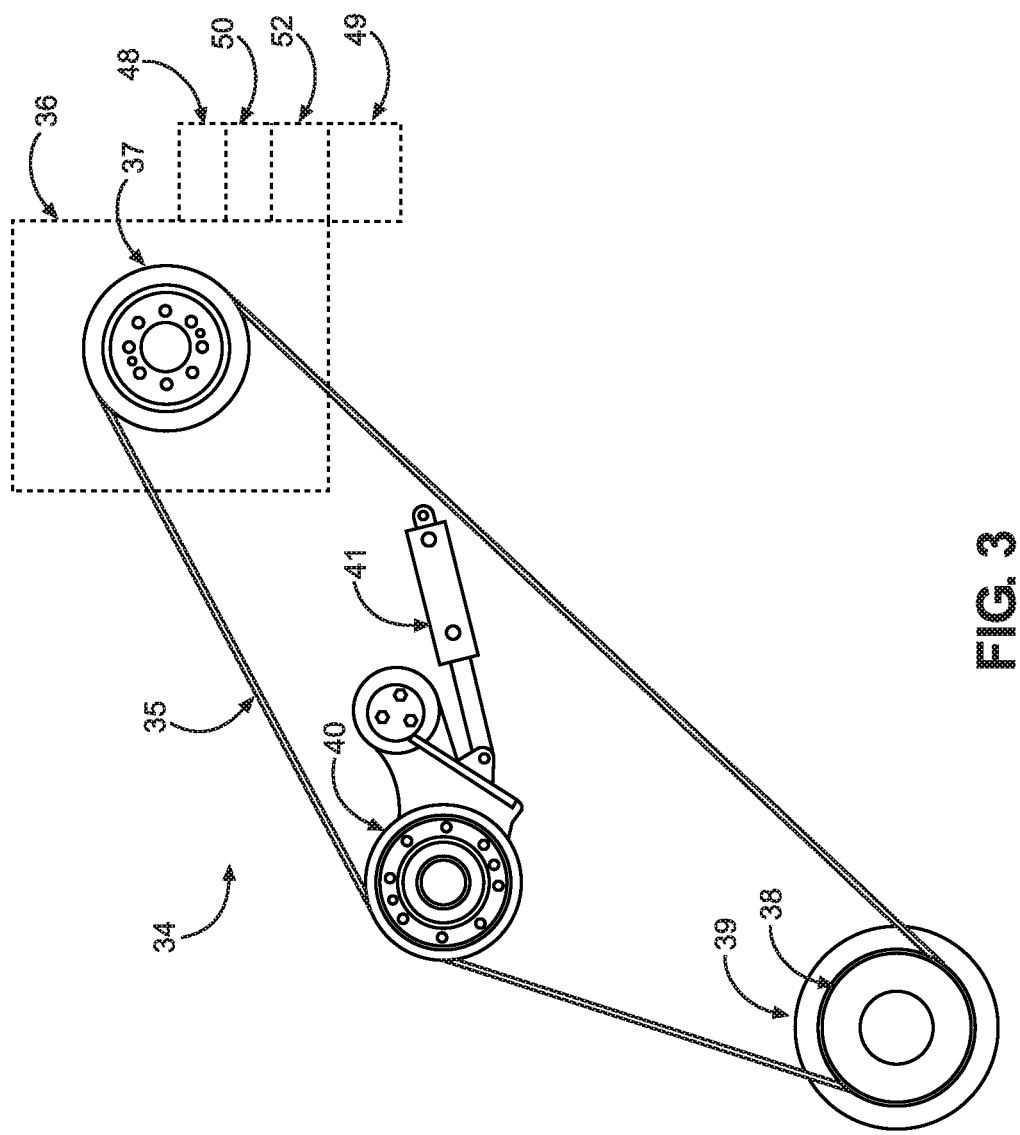
FIG. 3 is a front view of certain components of the primary drive assembly for the milling drum of the milling machine shown in FIGS. 1 and 2.

In the embodiment of the invention shown in FIGS. 1-7 and 9, proximity sensors 54 comprise PreView Sentry™ radar sensors that are made and sold by Preco Electronics of Boise, Id. These sensors transmit and receive 24 GHz radar signals, and they process reflected return signals to determine if an object or person is located in a proximity detection zone. Each sensor has a horizontal field of view $H_{54}$ of up to about 150°, as shown in FIGS. 2 and 11, a vertical field of view $V_{54}$ of up to about 20°, as shown in FIG. 1, and a range of up to 30 meters.

Figure 12:
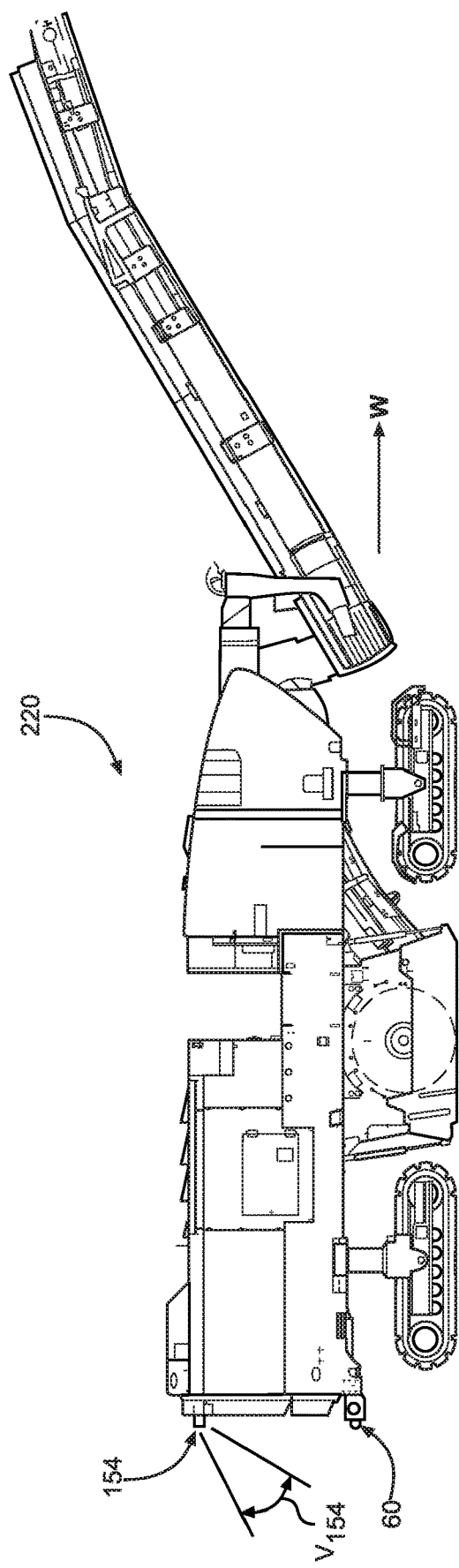
FIG. 12 is a side view of a milling machine which includes a second embodiment of the proximity sensors of the invention, a portion of the detection zones for the second embodiment of the proximity sensors, and alternative locations for the reverse disable buttons.
Figure 13:
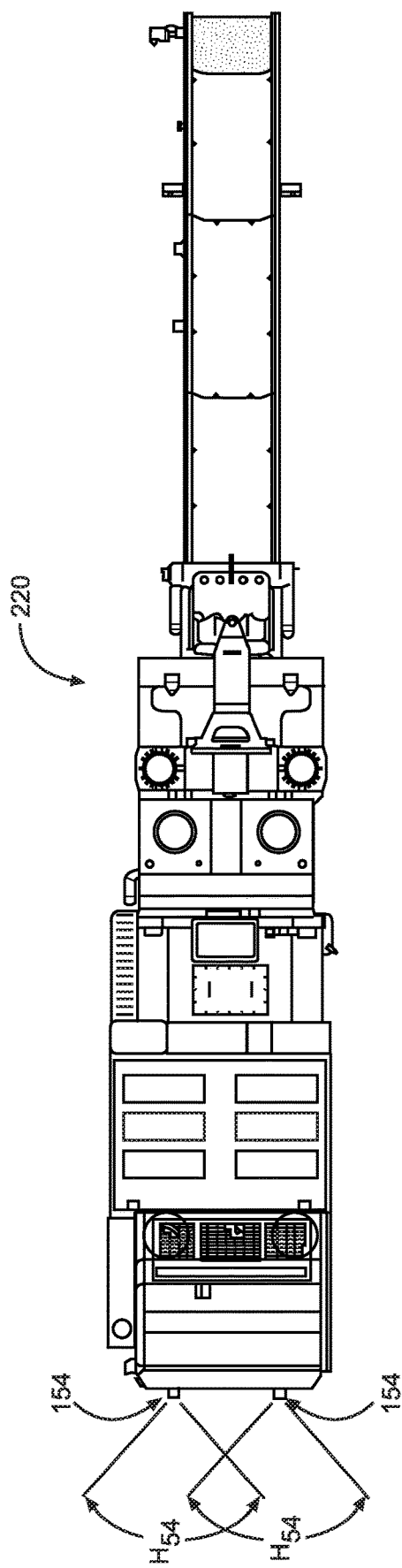
FIG. 13 is a top view of the milling machine shown in FIG. 12 showing a portion of the detection zones for the second embodiment of the proximity sensors.

In the embodiment of the invention shown in FIGS. 12 and 13, milling machine 220, which is essentially identical to milling machine 20, is provided with a pair of proximity sensors 154 that are mounted at the top of the rear end of the working machine. Proximity sensors 154 comprise O3M 3D Smart™ sensors that are supplied by IFM Electronic (Ireland) Ltd. of Dublin, Ireland. This type of sensor uses photonic mixing device (PMD) time-of-flight technology to create 3D imaging and distance monitoring. The O3M 3D Smart™ sensor includes an infrared light emission unit that transmits infrared light in a continuous series of signals into the detection zones, and uses the phase shift of light reflected from any object or person detected therein to determine the distance from the sensor to the object or person detected. An O3M 3D Smart™ sensor includes an emission unit that transmits light within a predetermined vertical field of view $V_{154}$ that is about 32°, as shown in FIG. 12, a predetermined horizontal field of view $H_{154}$ that is about 95°, as shown in FIG. 13, and at a range of up to 35 meters.

The O3M 3D Smart™ sensor employs 1024 discrete light pulse emissions per scan, each at a different angle within vertical angular field of view $V_{154}$ and/or horizontal field of view $H_{154}$. In other words, the O3M 3D Smart™ sensor is adapted to emit a plurality of discrete light pulse emissions in each scan pass, and each such light pulse emission in a scan pass is emitted at a different angle within a predetermined vertical angular range and/or a predetermined horizontal angular range from that of each other light pulse emission in the scan pass. A light receiving unit on the O3M 3D Smart™ sensor receives any reflected light pulses at roughly 50 pulses per second, and a photonic mixing device determines the time taken for the transmitted light to be reflected off of a person or object and return to the sensor. Proximity sensor 154 is adapted to determine the distance to the person or object detected, and to communicate this information to a controller such as controller 46. The controller can then take appropriate action, depending on whether the person or object detected is in the warning zone or the danger zone.

It is clear from FIGS. 10 and 13 that when two or more proximity sensors are employed that are spaced horizontally across the rear of a working machine, the angular ranges of their horizontal fields of view will overlap, and in such circumstances, the controller will preferably be programmed to take this overlap into account. Similarly, if two are more proximity sensors are spaced vertically across the rear of a working machine, the angular ranges of their vertical fields of view will overlap, and in such circumstances, the controller will preferably be programmed to take this overlap into account. Furthermore, the proximity sensors can be arranged so that their vertical and horizontal fields of view are oriented differently from those shown in FIGS. 1 and 10-13.

It is also contemplated within the scope of the invention that proximity sensors may be employed that emit radiation within the electromagnetic spectrum within predetermined horizontal and vertical fields of view that are different from those obtained by use of a PreView Sentry™ radar sensor or an O3M 3D Smart™ sensor.

In a particularly preferred embodiment, the invention also includes a pair of reverse disable buttons which are located at or near the rear end of the working machine. Thus, as shown in FIGS. 4-6 and 9, reverse disable buttons 60 are located on both sides of the rear end of milling machine 20.

In the alternative, the reverse disable buttons may be located on the sides of the milling machine near the rear end, as shown in FIG. 12. Preferably, these reverse disable buttons are illuminated touch buttons made and sold by Banner Engineering of Minneapolis, Minn. These reverse disable buttons are operatively attached to controller 46 and are preferably adapted, when activated, to cause the controller to operate braking assembly 49 and/or throttle assembly 50 to bring milling machine 20 to a stop. In this embodiment of the invention, the reverse disable buttons are in a cooperative relationship with the proximity sensors. Preferably, reverse disable buttons 60 are illuminated in three-color modes so that a ground worker can easily discern if a reverse disable button has been activated, or if the operator has overridden the automatic actions imposed by the proximity sensors. In this embodiment of the invention, when the reverse disable buttons are not activated, they will illuminate "green". If a ground person wants to safely walk behind the milling machine while it is operating, he need only touch one of the green-illuminated reverse disable buttons 60. This action will send a signal to the controller to operate gear shift assembly 48 to prevent the machine from moving in the reverse direction, or to stop the machine if it is already moving in the reverse direction. It will also cause both of the reverse disable buttons to illuminate "red". After the ground worker has moved to a safe location, pressing either of reverse disable buttons 60 that are red-illuminated will return them to a "green" safe state. However, in a preferred embodiment of the invention, after a reverse disable button has been engaged to change from a "red" state to a "green" state, controller 54 will require the operator of the milling machine to return gear shift assembly 48 to "neutral" before shifting again into "reverse". In other words, after the controller has caused gear shift assembly 48 to be operated so that the milling machine may move only in a forward direction, the controller will prevent the operator from operating the gear shift assembly to move the working machine in a reverse direction until after the operator has placed the gear shift assembly in a neutral position.

If the operator is seeking to move the machine in reverse towards an unmovable object, it may be necessary to override the automatic actions imposed by the proximity sensors. In such event, the operator may engage a data input component associated with the controller, such as an actuating button that is operatively connected to the controller, the proximity sensors and the reverse disable buttons. If the override function is engaged, the controller will ignore the proximity sensors, and it will cause the reverse disable buttons to illuminate "amber". This will alert any ground personnel that the override function is engaged. However, even when the override function is engaged, activating a reverse disable button will send a signal to the controller to operate gear shift assembly 48 to prevent the machine from moving in the reverse direction, or to stop the machine if it is already moving in the reverse direction. It will also cause both of the reverse disable buttons to illuminate "red". After the ground worker has moved to a safe location, pressing either of reverse disable buttons 60 that are red-illuminated will return them to a "green" safe state, and the operator will again have to engage the override function to override the automatic actions imposed by the proximity sensors. Preferably, the override function is operated in a multi-step process wherein the operator: (1) engages the gear shift to enable reverse movement; and (2) engages an actuating button labeled "OVERRIDE" which causes the controller to send a signal to an operator's display screen such as "ARE YOU SURE?"; after which (3) the operator may press another button associated with the display to acknowledge that the override function is to be engaged by the controller.

Figure 14:
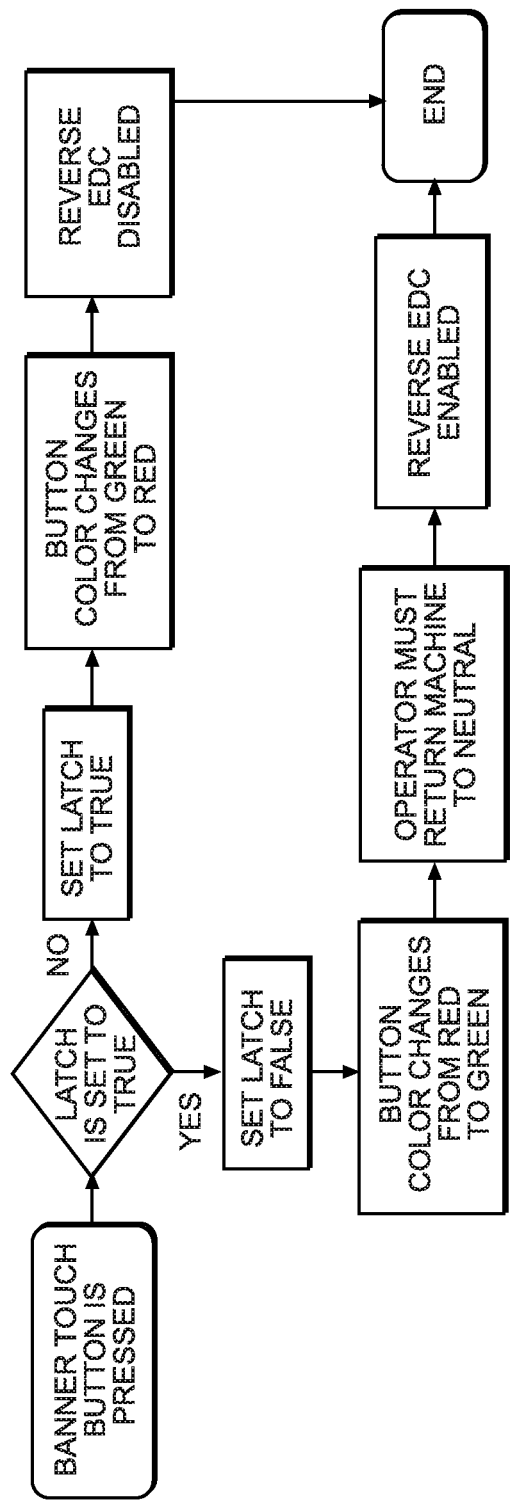
FIG. 14 is a flow chart showing the operation of the preferred reverse disable button.

FIG. 14 comprises a flow chart that illustrates the operation of a preferred embodiment of the reverse disable buttons in cooperation with controller 46.

The preferred embodiment of the invention thus provides a combination voluntary/involuntary redundant parallel control system. Locating reverse disable buttons 60 on the outside corners of the rear end of the machine allows a ground worker to enable or disable the ability of the machine to move in the reverse direction from either side of the machine. These reverse disable buttons are mounted on a lower portion of the frame, as shown in the drawings, so that their elevation will change as the lifting columns raise or lower the frame of the machine. Proximity sensors 54 and 154 provide an involuntary control feature that can preferably be overridden by the machine operator, and in this embodiment of the invention, they must be overridden any time the machine is shifted into reverse if a person or object is detected. The location of proximity sensors 54 on the rear fenders of the ground-engaging assemblies allows for ground-level detection of fallen objects while still detecting taller objects. Similarly, proximity sensors 154 at the top of the rear end of the working machine can be oriented so as to provide a vertical field of view that will detect objects fallen objects and persons and other objects in the proximity detection zones.

Although this description contains many specifics, these should not be construed as limiting the scope of the invention but as merely providing an illustration of the presently preferred embodiments thereof, as well as the best mode contemplated by the inventors of carrying out the invention. The invention, as described herein, is susceptible to various modifications and adaptations as would be appreciated by those having ordinary skill in the art to which the invention relates.

What is claimed is:

1. A working machine that is operated by an operator in an operator's station and is adapted to perform a working operation on a roadway or road bed, said working machine comprising:
  (a) a braking assembly that is adapted to brake the working machine;
  (b) a throttle assembly that is adapted to control the speed of the working machine;
  (c) a controller that is mounted on the working machine and is operatively connected to:
    (i) the braking assembly; and
    (ii) the throttle assembly;
  (d) a left steerable rear drive assembly and a right steerable rear drive assembly;
  (e) a left proximity sensor that is mounted at or near the rear end of the working machine on the left steerable rear drive assembly, said left proximity sensor being:
    (i) operatively connected to the controller;
    (ii) located and adapted to emit radiation within the electromagnetic spectrum in a direction away from the rear of the working machine, and to receive reflected radiation indicating the presence of a person or object within a predetermined left danger zone adjacent to the rear of the working machine and in a predetermined left warning zone that extends beyond the predetermined left danger zone;
  (f) a right proximity sensor that is mounted at or near the rear end of the working machine on the right steerable rear drive assembly, said right proximity sensor being:
    (i) operatively connected to the controller;

(ii) located and adapted to emit radiation within the electromagnetic spectrum in a direction away from the rear of the working machine, and to receive reflected radiation indicating the presence of a person or object within a predetermined right danger zone adjacent to the rear of the working machine and in a predetermined right warning zone that extends beyond the predetermined right danger zone;

(g) wherein at least one of the left proximity sensor and the right proximity sensor is adapted to:
   (i) send a signal to the controller when it detects a person or object in at least one of the predetermined left danger zone and the predetermined right danger zone to cause said controller to operate the braking assembly to brake the working machine;
   (ii) send a signal to the controller when it detects a person or object in at least one of the predetermined left warning zone and the predetermined right warning zone to cause said controller to operate the throttle assembly to reduce the speed of the working machine by a predetermined amount;

(h) wherein the controller is configured and adapted so that when the left and right steerable rear drive assemblies are operated to turn the working machine to the left, the controller will ignore any signals received from the right proximity sensor;

(i) wherein the controller is configured and adapted so that when the left and right steerable rear drive assemblies are operated to turn the working machine to the right, the controller will ignore any signals received from the left proximity sensor.

2. The working machine of claim 1:
(a) which includes a frame;
(b) which includes a working component that is adapted to perform the working operation on the roadway or road bed.

3. The working machine of claim 1 wherein the controller is adapted to:
(a) send a danger signal to the operator in the operator's station when the controller receives a signal indicating that at least one of the left proximity sensor and the right proximity sensor has detected something in at least one of the predetermined left danger zone and the predetermined right danger zone;
(b) send a warning signal to the operator in the operator's station when the controller receives a signal indicating that at least one of the left proximity sensor and the right proximity sensor has detected something in at least one of the predetermined left warning zone and the predetermined right warning zone.

4. The working machine of claim 1 wherein the controller is programmed so that if the working machine is moving at a speed below a predetermined minimum speed, the controller will not slow the machine if at least one of the left proximity sensor and the right proximity sensor detects a person or object in at least one of the predetermined left warning zone and the predetermined right warning zone, but the controller will bring the machine to a halt if at least one of the left proximity sensor and the right proximity sensor detects a person or object in at least one of the predetermined left danger zone and the predetermined right danger zone.

5. The working machine of claim 1:
(a) which includes two or more proximity sensors that are spaced horizontally across the rear of the working machine, so that the angular ranges of their horizontal fields of view will overlap;
(b) wherein the controller is programmed to take this overlap into account.

6. The working machine of claim 1:
(a) which includes two or more proximity sensors that are spaced vertically across the rear of the working machine, so that the angular ranges of their vertical fields of view will overlap;
(b) wherein the controller is programmed to take this overlap into account.

7. The working machine of claim 1 wherein at least one of the left proximity sensor and the right proximity sensor emits radiation within the electromagnetic spectrum within a predetermined vertical field of view that is within the range of about 20° to about 32°.

8. The working machine of claim 1 wherein at least one of the left proximity sensor and the right proximity sensor emits radiation within the electromagnetic spectrum within a predetermined horizontal field of view that is within the range of about 95° to about 150°.

9. The working machine of claim 1 wherein the controller is programmed to allow the operator to override the actions initiated by at least one of the left proximity sensor and the right proximity sensor.

10. The working machine of claim 9:
(a) which includes a gear shift assembly that may be positioned to operate the working machine in either a forward or a reverse direction;
(b) wherein the gear shift assembly is operatively connected to the controller;
(c) wherein the controller is programmed so that the actions initiated by at least one of the left proximity sensor and the right proximity sensor may only be overridden when the gear shift assembly is positioned to operate the working machine in the reverse direction.

11. The working machine of claim 1 which includes a reverse disable button located at or near the rear end of the working machine which is accessible to a ground operator, wherein the reverse disable button is:
(a) operatively attached to the controller;
(b) adapted to be activated by the ground operator;
(c) adapted when so activated, to cause the controller to operate the braking assembly and/or the throttle assembly to bring the working machine to a stop.

12. The working machine of claim 11:
(a) wherein the controller is adapted to cause the reverse disable button to illuminate green when the reverse disable button is not activated;
(b) wherein the controller is adapted to cause the reverse disable button to illuminate red when the reverse disable button is activated.

13. The working machine of claim 11:
(a) which includes a data input component that is operatively connected to the controller, at least one of the left proximity sensor and the right proximity sensor and the reverse disable button, which data input component may be engaged by the operator to override actions initiated by at least one of the left proximity sensor and the right proximity sensor;
(b) wherein the controller is programmed to allow the operator to engage the data input component to override the actions initiated by at least one of the left proximity sensor and the right proximity sensor;
(c) wherein when the data input component is engaged to override the actions initiated by at least one of the left proximity sensor and the right proximity sensor, the controller will ignore any signals received from at least one of the left proximity sensor and the right proximity sensor.

14. The working machine of claim 13 wherein the controller is adapted to cause the reverse disable button to illuminate amber when the override function is engaged.

15. The working machine of claim 13:
(a) which includes a gear shift assembly that may be positioned to operate the working machine in either a forward or a reverse direction;
(b) wherein the gear shift assembly is operatively connected to the controller;
(c) wherein the controller is programmed so that the actions initiated by at least one of the left proximity sensor and the right proximity sensor may only be overridden when the gear shift assembly is positioned to operate the working machine in the reverse direction.

16. The working machine of claim 13 wherein the reverse disable button is adapted, when activated, to cause the controller to lock gear shift assembly so that the working machine may only move in a forward direction.

17. The working machine of claim 16 wherein
(a) the gear shift assembly may be positioned in a neutral position;
(b) after the controller has locked the gear shift assembly so that the working machine may move only in a forward direction, the controller will prevent the operator from operating the gear shift assembly to move the working machine in a reverse direction until after the operator has placed the gear shift assembly in the neutral position.

* * * * *